(12) United States Patent
Ghezel-Ayagh et al.

(10) Patent No.: US 8,815,462 B2
(45) Date of Patent: Aug. 26, 2014

(54) FUEL CELL POWER PRODUCTION SYSTEM WITH AN INTEGRATED HYDROGEN UTILIZATION DEVICE

(75) Inventors: Hossein Ghezel-Ayagh, New Milford, CT (US); Fred C. Jahnke, Rye, NY (US)

(73) Assignee: FuelCell Energy, Inc., Danbury, CT (US)

( * ) Notice: Subject to any disclaimer, the term of this patent is extended or adjusted under 35 U.S.C. 154(b) by 1069 days.

(21) Appl. No.: 12/525,751

(22) PCT Filed: Jan. 31, 2008

(86) PCT No.: PCT/US2008/052586
§ 371 (c)(1),
(2), (4) Date: Aug. 4, 2009

(87) PCT Pub. No.: WO2008/097797
PCT Pub. Date: Aug. 14, 2008

(65) Prior Publication Data
US 2010/0028730 A1   Feb. 4, 2010

Related U.S. Application Data

(60) Provisional application No. 60/888,186, filed on Feb. 5, 2007.

(51) Int. Cl.
| | |
|---|---|
| H01M 8/04 | (2006.01) |
| F02C 3/22 | (2006.01) |
| H01M 8/06 | (2006.01) |
| F02C 1/00 | (2006.01) |
| F02C 3/36 | (2006.01) |
| H01M 8/24 | (2006.01) |
| F02G 1/04 | (2006.01) |
| H01M 8/12 | (2006.01) |
| H01M 8/14 | (2006.01) |

(52) U.S. Cl.
CPC .......... *H01M 8/04014* (2013.01); *F02C 3/22* (2013.01); *H01M 8/0662* (2013.01); *H01M 2250/20* (2013.01); *F02C 1/007* (2013.01); *Y02E 60/525* (2013.01); *H01M 8/04097* (2013.01); *Y02B 90/12* (2013.01); *F02C 3/36* (2013.01); *H01M 2008/1293* (2013.01); *Y02E 20/14* (2013.01); *Y02E 60/526* (2013.01); *H01M 2008/147* (2013.01); *H01M 8/04164* (2013.01); *Y02T 90/32* (2013.01); *H01M 2250/402* (2013.01); *H01M 8/14* (2013.01); *H01M 8/04111* (2013.01); *H01M 8/04141* (2013.01); *H01M 8/2495* (2013.01); *H01M 8/04171* (2013.01); *F02G 1/04* (2013.01)
USPC ........... 429/444; 429/443; 429/408; 429/411; 429/412; 429/414

(58) Field of Classification Search
USPC ................. 429/408, 410–417, 443, 444, 450
See application file for complete search history.

(56) References Cited

U.S. PATENT DOCUMENTS

| | | |
|---|---|---|
| 4,031,865 A | 6/1977 | Dufour |
| 4,622,275 A * | 11/1986 | Noguchi et al. ............. 429/423 |
| 4,917,971 A | 4/1990 | Farooque |
| 5,541,014 A | 7/1996 | Micheli et al. |
| 6,162,556 A | 12/2000 | Vollmar et al. |
| 6,329,091 B1 | 12/2001 | James |
| 6,365,290 B1 | 4/2002 | Ghezel-Ayagh et al. |
| 6,609,582 B1 | 8/2003 | Botti et al. |
| 6,655,325 B1 | 12/2003 | Botti et al. |
| 6,868,677 B2 | 3/2005 | Viteri et al. |
| 6,896,988 B2 * | 5/2005 | Wang et al. .................... 429/423 |
| 6,994,930 B1 | 2/2006 | Geisbrecht et al. |
| 7,153,599 B2 * | 12/2006 | Bunker et al. ................ 429/415 |
| 7,862,938 B2 * | 1/2011 | Ghezel-Ayagh ............. 429/425 |
| 2002/0092287 A1 | 7/2002 | Logvinov et al. |
| 2002/0094462 A1 | 7/2002 | Shioya et al. |
| 2002/0119354 A1 | 8/2002 | O'Brien et al. |
| 2004/0058211 A1 | 3/2004 | Tachtler et al. |
| 2005/0014039 A1 | 1/2005 | Rolf |
| 2005/0048345 A1 | 3/2005 | Meacham |
| 2005/0058863 A1 | 3/2005 | Wang et al. |
| 2005/0271914 A1 | 12/2005 | Farooque et al. |
| 2006/0046107 A1 | 3/2006 | Lindsey |

FOREIGN PATENT DOCUMENTS

| EP | 0 430 017 A2 | 6/1991 |
| EP | 0 521 185 A1 | 1/1993 |
| WO | WO 99/46032 | 9/1999 |
| WO | 2004/013924 A2 | 2/2004 |

OTHER PUBLICATIONS

The above references were cited in a Supplementary European Search Report issued on Feb. 25, 2011, a copy of which is enclosed, that issued in the corresponding European Patent Application No. 08728654.

\* cited by examiner

*Primary Examiner* — Carlos Barcena
(74) *Attorney, Agent, or Firm* — Cowan, Liebowitz & Latman, P.C.

(57) ABSTRACT

A fuel cell power production system and method for supplying power to a load, comprising a high-temperature fuel cell including an anode compartment, adapted to receive fuel from a fuel supply path and to output anode exhaust, and a cathode compartment adapted to receive oxidant gas and to output cathode exhaust, a water transfer assembly for transferring water in the anode exhaust to the fuel supply path and for outputting water-separated anode exhaust; and a hydrogen utilization device adapted to receive oxidant gas and one of the water-separated anode exhaust and gas derived from the water-separated anode exhaust and to output hydrogen utilization device exhaust including oxidant gas, wherein the hydrogen utilization device exhaust is used to provide oxidant gas to said cathode compartment.

20 Claims, 5 Drawing Sheets

FUEL CELL POWER PRODUCTION SYSTEM WITH AN INTEGRATED HYDROGEN UTILIZATION DEVICE

CROSS-REFERENCE TO RELATED APPLICATIONS

This application is a national phase application of International application Serial No. PCT/US2008/052586, filed Jan. 31, 2008, which is based on U.S. Provisional Application No. 60/888,186, filed Feb. 5, 2007.

BACKGROUND OF THE INVENTION

This invention relates to fuel cell production systems and, in particular, to a fuel cell production system with an integrated hydrogen utilization device.

A fuel cell is a device which directly converts chemical energy stored in hydrocarbon fuel into electrical energy by means of an electrochemical reaction. Generally, a fuel cell comprises an anode electrode and a cathode electrode separated by an electrolyte, which serves to conduct electrically charged ions.

As can be appreciated, variable loads, powered by a fuel cell, have placed varying power demands on the fuel cell during its operation. Accordingly, fuel cells must efficiently handle these varying power demands, while producing sufficient power to satisfy the demands. As a result, in order to increase the fuel cell efficiency and to improve the handling of high and low power demands, fuel cell systems have been proposed in which excess hydrogen fuel in the anode exhaust (e.g., in a molten carbonate fuel cell, approximately 10 to 50% of the fuel exits the cell as anode exhaust gas) is stored for future use either by the fuel cell when the fuel demand (power demand) increases or by other devices which use hydrogen as fuel. In addition, also to improve efficiency, fuel cell systems often extract a portion or all of the hydrogen from the anode exhaust, and recycle the extracted hydrogen fuel back to the anode input of the fuel cell.

In one type of arrangement described in U.S. Pat. No. 6,162,556, excess hydrogen that is not consumed during the electrochemical reaction in a high temperature fuel cell is extracted and then collected and stored outside of the fuel cell for future use. More particularly, in the arrangement of the '556 patent, anode exhaust gas containing carbon monoxide, hydrogen, water and carbon dioxide is passed through a shift reactor, where a majority of carbon monoxide is converted together with water into carbon dioxide and hydrogen. The resulting anode exhaust gas is passed through a water extractor and a hydrogen separating apparatus so that essentially only the hydrogen remains in the exhaust. This hydrogen containing exhaust is stored in a storage apparatus and may later be supplied to another hydrogen user.

Other arrangements, described in U.S. Pat. No. 6,320,091 and International Application Publication No. WO 99/46032, employ a storage device for storing excess hydrogen fuel and a means for feeding stored hydrogen fuel to the fuel cell when fuel requirements are greater than the amount of fuel being delivered to the fuel cell. In the case of the '091 patent, a metal hydride system serves as a load leveling device based on gas pressure by storing hydrogen gas delivered from a reformer when the reformer output exceeds fuel cell hydrogen consumption and delivers stored hydrogen to the fuel cell when reformer output is less than the fuel cell consumption. International Application Publication No. WO 99/46032 describes a system employing hydrogen storage means for storing hydrogen produced by a burner module when such fuel is not immediately required by the fuel cell, and a means for feeding stored hydrogen fuel to the fuel cell when the fuel demands are greater than the amount of hydrogen produced by the burner module.

In addition to the above types of systems, other arrangements using multiple fuel cells and fuel cells in combination with other fuel consuming devices, have been used to improve power production as well as handling during high and low power demands. One such system is disclosed in the commonly assigned U.S. Pat. No. 4,917,971, where a high-temperature molten carbonate fuel cell is followed by a low-temperature phosphoric acid fuel cell in a tandem arrangement. In another system described in U.S. Pat. No. 6,655,325, a fuel cell is used with an engine and/or a turbine, such that engine exhaust is passed to the anode of a solid oxide fuel cell for production of electricity, and fuel cell exhaust is recycled back to the engine or directed through a turbine to recover additional energy from the exhaust.

The state of the art systems that combine a fuel cell with another fuel consuming device suffer from a number of disadvantages. For example, many of the conventional systems do not have a black start capability and thus require assistance from a power system, such as a grid, to return to an operating condition after shutting down. In addition, the efficiency of the conventional systems is highly dependent on the fuel composition and fuel utilization rates, because fuel cells, particularly direct carbonate fuel cells, must operate at high utilization rates in order to maintain relatively high efficiency. Moreover, the conventional systems typically have high operating costs, including costs of supplying operating materials, such as fuel, oxidant gas and water, to the system components.

It is an object of the present invention to provide an improved fuel cell power production system having greater fuel efficiency, lower capital and operating costs and reduced emissions.

It is a further object of the present invention to provide a fuel cell power production system employing a high-temperature fuel cell integrated with a hydrogen utilization device, and which is capable of processing high temperature, low pressure anode exhaust gas for efficient use in the hydrogen utilization device.

It is yet another object of the present invention to provide a fuel cell power production system having a black start capability.

SUMMARY OF THE INVENTION

The above and other objectives are realized in a fuel cell power production system for supplying power to a load, comprising a high-temperature fuel cell including an anode, adapted to receive fuel from a fuel supply path and to output anode exhaust, and a cathode adapted to receive oxidant gas and to output cathode exhaust, a water transfer assembly for transferring water in the anode exhaust to the fuel supply path and for producing water-separated anode exhaust, and a hydrogen utilization device adapted to receive oxidant gas and one of the water-separated anode exhaust gas and gas derived from the water-separated anode exhaust and to output hydrogen utilization device exhaust including oxidant gas, wherein the hydrogen utilization device exhaust is used to provide oxidant gas to the cathode. The hydrogen utilization device comprises one of an internal combustion engine, a diesel engine, a combustion turbine, a recuperative turbine and a microturbine. The high temperature fuel cell is a carbonate fuel cell or solid oxide fuel cell.

In certain embodiments, the hydrogen utilization device is further adapted to receive air as the oxidant gas and supplemental fuel and the system further includes a control assembly responsive to variations in the load and adapted to control supplemental fuel and air provided to the hydrogen utilization device. In some embodiments, the water transfer assembly comprises a heat exchanger for condensing water in the anode exhaust, a knockout pot for separating water from the remaining exhaust and a pump for increasing pressure of separated water. In other embodiments, the water transfer assembly comprises a cooling radiator, a direct cooling packed column or a water transfer wheel. In the present illustrative embodiments, fuel in the fuel supply path is pre-heated using at least one of the cathode exhaust and the anode exhaust. In some embodiments, the system also includes an oxidizer assembly for oxidizing and pre-heating the hydrogen utilization device exhaust to output the oxidant gas to the cathode.

In certain embodiments, the fuel cell power production system also includes a bypass path for passing the remaining anode exhaust from the water transfer assembly to the oxidizer without providing the anode exhaust to the hydrogen utilization device, a storage device, and/or an export path. The control assembly of the system is adapted to selectively couple the water-separated anode exhaust gas after passing through the water transfer assembly to at least one of the hydrogen utilization device and the bypass path. The control assembly is also adapted to selectively couple a portion of the water-separated anode exhaust gas to the storage device and/or to the export path, and to selectively couple anode exhaust from the storage device to the hydrogen utilization device.

In certain embodiments, the control assembly includes a controller responsive to variations in the load, and a coupling unit responsive to the controller for selectively allowing portions of the water-separated anode exhaust to be conveyed to the hydrogen utilization device, the storage device, the export path and the bypass path, wherein at least a portion of the anode exhaust is coupled to at least one of the hydrogen utilization device and the bypass path, and for selectively allowing at least a portion of the anode exhaust in the storage device to be coupled to the hydrogen utilization device. In addition to the bypass path and the export path, the system also includes an anode exhaust path for carrying the water-separated anode exhaust from the water transfer assembly, a first recycle path, a second recycle path, a hydrogen utilization device input path, a storage device input path, and a storage device output path. The coupling unit includes a first coupling assembly which selectively couples water-separated anode exhaust in the anode exhaust path to the first recycle path and the second recycle path, a second coupling assembly which selectively couples water-separated anode exhaust in the second recycle path to the export path and the storage device input path, a third coupling assembly which couples the water-separated anode exhaust in the storage device to the hydrogen utilization device input path, and a fourth coupling assembly which selectively couple the water-separated anode exhaust gas in the first recycle path to the hydrogen utilization device input path and the bypass path.

The controller controls the first through fourth coupling assemblies such that at least a portion of the water-separated anode exhaust gas is coupled to the first recycle path at all operating times. The controller further controls the coupling assemblies such that when the load exhibits a low power demand, a portion of the water-separated anode exhaust gas is coupled to at least one of the bypass path and the second recycle path, and when the load exhibits a high power demand, the water-separated anode exhaust is coupled to the first recycle path and the hydrogen utilization device input path, and a portion of the water-separated anode exhaust in the storage device is coupled to the storage device output path. The controller also controls supply of the supplemental fuel to the hydrogen utilization device such that when the load exhibits low power demand, no supplemental fuel is supplied to the hydrogen utilization device, and when the load exhibits a high power demand, a predetermined amount of supplemental fuel is supplied to the hydrogen utilization device to satisfy the high power demand.

In certain embodiments, the fuel cell power production system further comprises a hydrogen transfer assembly which receives a portion of water-separated anode exhaust and transfers hydrogen in the water-separated anode exhaust to an export path. In such embodiments, the control assembly is adapted to selectively couple a portion of the water-separated anode exhaust to the hydrogen water transfer assembly. The hydrogen transfer assembly also outputs hydrogen-separated anode exhaust which is received by the hydrogen utilization device. In some embodiments, the hydrogen transfer assembly includes a compressor for compressing the portion of the water-separated anode exhaust and a PSA assembly for separating hydrogen from the compressed water-separated anode exhaust and for outputting the hydrogen-separated gas to the hydrogen utilization device. When exporting hydrogen, a water gas shift unit is often included after initial cooling of the anode exhaust gas to convert CO in the anode exhaust to $H_2$ and to maximize the amount of hydrogen available for export. Because exporting hydrogen or water-separated anode exhaust gas removes heat from the system in the form of fuel, integrating the hydrogen transfer assembly into a system with a hydrogen utilization device which uses supplemental fuel, allows for an increased amount of hydrogen export without being limited by heat available.

Specific embodiments in which the hydrogen utilization device comprises a combustion turbine, a recuperative turbine or a microturbine are also described herein. Moreover, a method of power production using a fuel cell power production system is provided.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
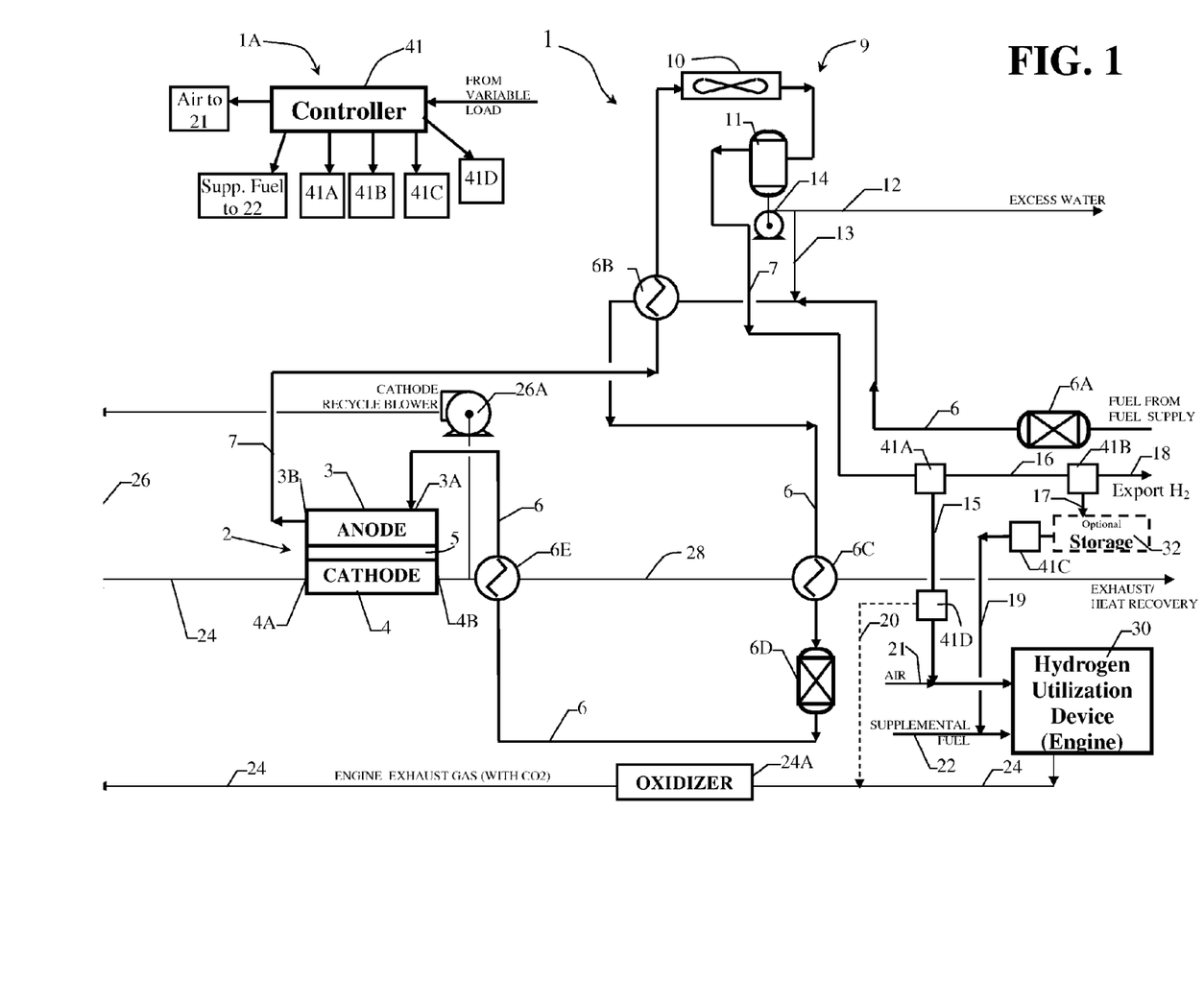
FIG. 1 shows a block diagram of a fuel cell power production system using a fuel cell integrated with a hydrogen utilization device.

FIG. 1 shows a fuel cell power production system 1 for supplying power to a load comprising a high-temperature fuel cell 2 including an anode compartment 3, adapted to receive fuel from a fuel supply path 6 and to output anode exhaust, and a cathode compartment 4 adapted to receive oxidant gas and to output cathode exhaust, a water transfer assembly 9 for transferring water in the anode exhaust to the fuel supply path 6 and for outputting water-separated anode exhaust, and a hydrogen utilization device 30. The hydrogen utilization device 30 is adapted to receive oxidant gas and one of the water-separated anode exhaust and gas derived from the water-separated anode exhaust after water has been transferred from the anode exhaust gas by the water transfer assembly 9 and to output hydrogen utilization device exhaust gas including oxidant gas. The hydrogen utilization device exhaust is then used to provide oxidant gas to the cathode 4.

Figure 2:
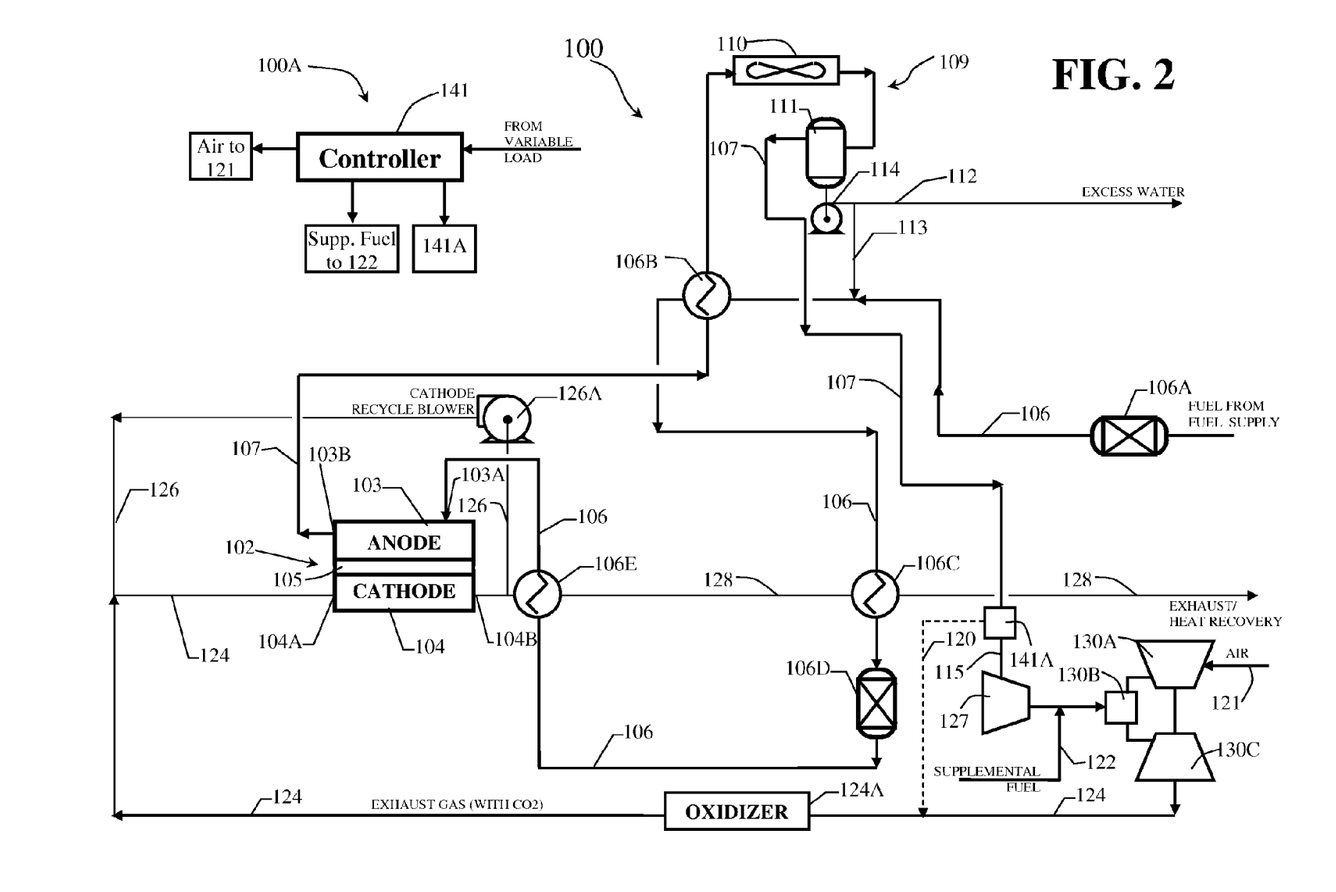
FIG. 2 shows an embodiment of the fuel cell power production system of FIG. 1, using a combustion turbine as the hydrogen utilization device.
Figure 3:
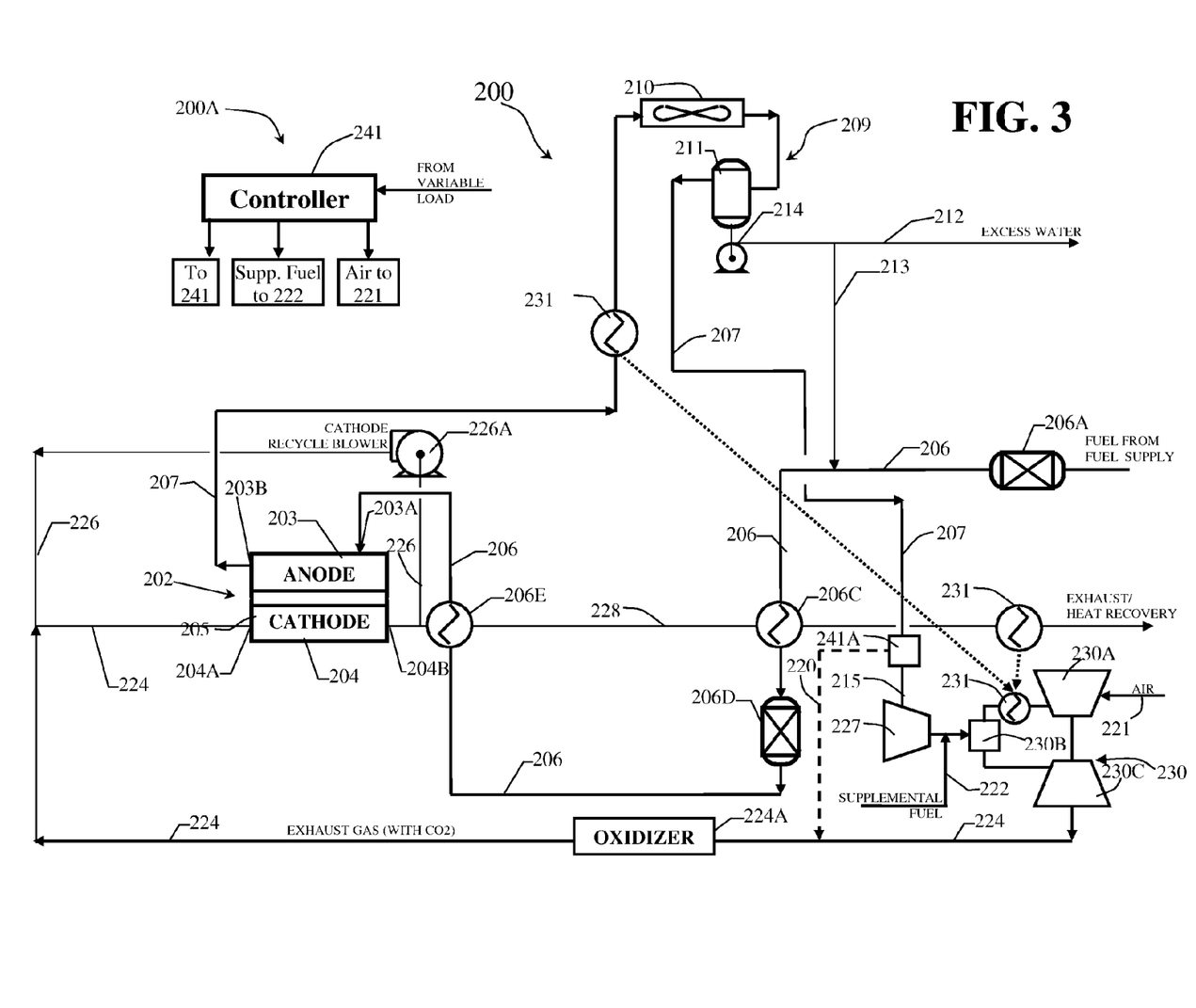
FIG. 3 shows an embodiment of the fuel cell power production system of FIG. 1 using a recuperative turbine as the hydrogen utilization device.
Figure 4:
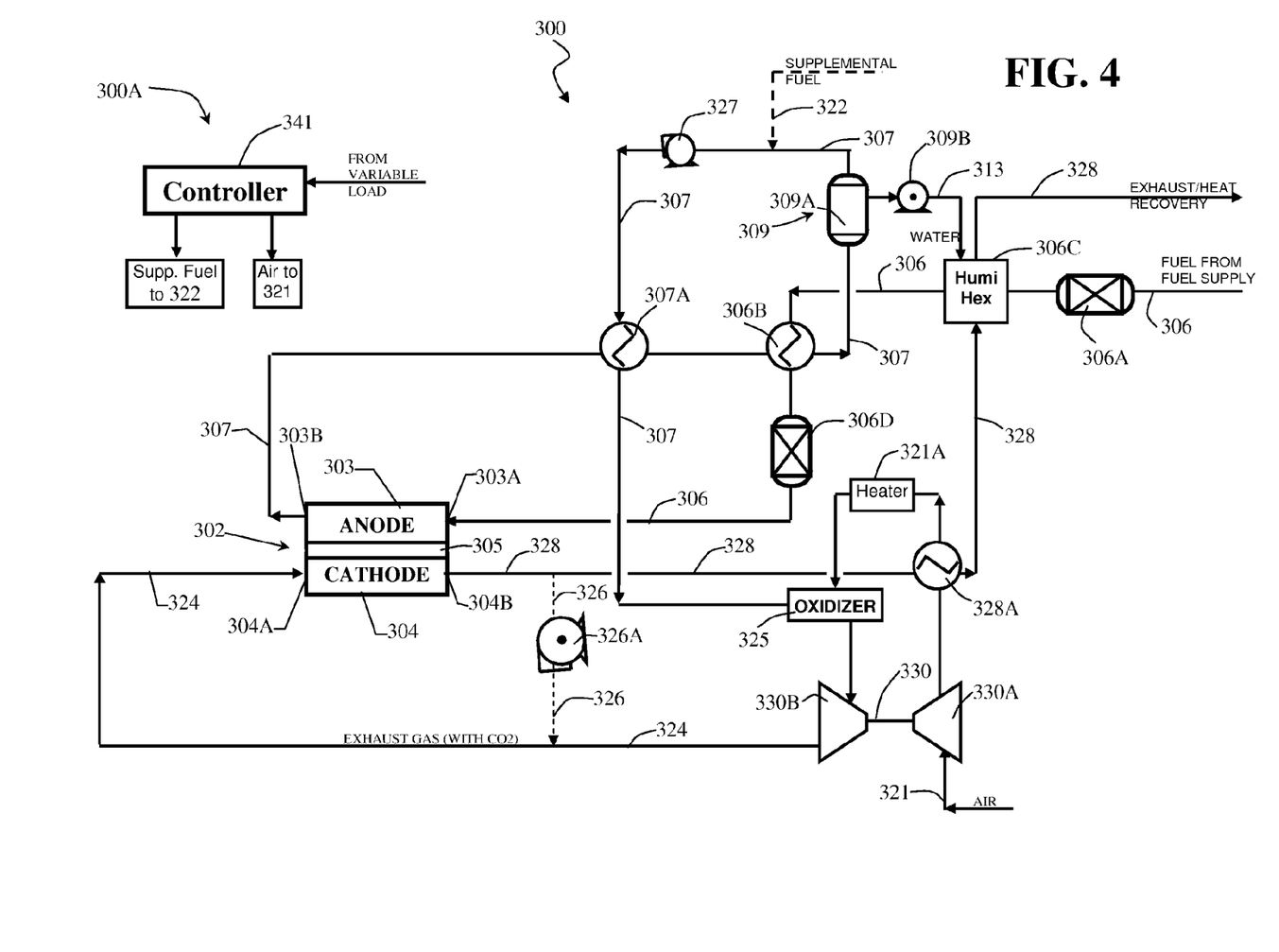
FIG. 4 shows an embodiment of the fuel cell power production system of FIG. 1 using a microturbine as the hydrogen utilization device.

In this illustrative embodiment, the high-temperature fuel cell 2 is a carbonate fuel cell and the hydrogen utilization device 30 is a low-temperature $CO_2$ and CO tolerant engine, such as an internal combustion engine, or a diesel engine. It is understood that use of other types of $CO_2$ and CO tolerant hydrogen utilization devices and of other types of high-temperature fuel cells is contemplated within the scope of the invention, some of which are shown in FIGS. 2-4. For internal combustion engines, the low pressure water-separated anode exhaust does not need to be compressed to feed the engine. If necessary for optimal engine operation, the exhaust gas from the hydrogen utilization device may be combined with oxidant gas in the form of air from an air blower separate from the engine. The fuel cell power production system 1 shown in FIG. 1 may also include an optional storage device 32 for storing water-separated anode exhaust fuel for future use by the hydrogen utilization device 30 when needed for large load variations. Compression of the water-separated anode exhaust fuel may be employed to more efficiently store the gas using a compressor (not shown in FIG. 1). When filling the storage device, the power used by the compressor will also reduce the net power production during low loads, increasing the range of load variation possible. An export path 18 may also be optionally included in the system 1 for exporting hydrogen-rich water-separated anode exhaust out of the system. As discussed in more detail herein below, the operation of the fuel cell power production system 1 and the flow of fuel and of other operating materials to the fuel cell and the hydrogen utilization device are controlled using a control assembly 1A.

As shown in FIG. 1, the high-temperature fuel cell 2 of the system 1 comprises the anode compartment 3 and the cathode compartment 4, separated by an electrolyte matrix 5. A hydrocarbon containing fuel is supplied from a fuel supply (not shown for purposes of clarity and simplicity) to a fuel supply path 6 which carries the fuel to an inlet 3A of the anode compartment 3 of the fuel cell 2. In particular, as shown, the supply line 6 carries the fuel through a desulfurizer 6A, which removes sulfur-containing compounds present in the fuel. The desulfurizer 6A comprises one or more sulfur-adsorbent or sulfur-absorbent beds through which the fuel flows and which adsorb or absorb any sulfur-containing compounds in the fuel.

After being passed through the desulfurizer 6A, the fuel in the supply line 6 is combined with water from the water transfer assembly 9 via a water supply line 13 to produce humidified fuel which is then pre-heated in a first heat exchanger 6B by anode exhaust gas and in a second heat exchanger 6C by cathode exhaust gas. The pre-heated humidified fuel is then passed through a deoxidizer/preconverter unit 6D, which removes any trace oxygen and heavy hydrocarbon contaminants from the fuel, and through a further heat exchanger 6E, where the fuel is further heated by cathode exhaust. The pre-heated deoxidized humidified fuel is then supplied to the anode compartment 3 through the inlet 3A.

Fuel entering the anode compartment 3 through the anode inlet 3A is reformed to produce hydrogen and carbon monoxide and undergoes an electrochemical reaction with oxidant gas passing through the cathode compartment 4 of the fuel cell 2. Anode exhaust gas produced in the anode compartment 3 exits the fuel cell 2 through an anode outlet 3B into an anode exhaust path 7. The anode exhaust gas in the exhaust path 7 comprises unreacted hydrogen, carbon monoxide, water vapor, carbon dioxide and trace amounts of other gases. Although not shown in FIG. 1, certain embodiments of the system 1 may include a shift converter for converting carbon monoxide and water in the anode exhaust into hydrogen and carbon dioxide. However, in the illustrative embodiment of FIG. 1, the shift converter is not required since the hydrogen utilization device 30, which receives anode exhaust gas, is CO tolerant.

As shown in FIG. 1, the anode exhaust in the exhaust path 7 is first cooled in the first heat exchanger 6B, thereby heating up the fuel in the supply path 6, and is then passed to a water transfer assembly 9 which includes another heat exchanger 10, a knock out pot 11 and a pump 14. In the water transfer assembly 9, the anode exhaust gas is further cooled in the heat exchanger 10 so that water present in the anode exhaust condenses and a mixture of liquid water and an exhaust gas comprising the remaining components of the anode exhaust gas is formed. The mixture of the exhaust gas and water steam is thereafter passed through the knock out pot 11 in which water is separated from the exhaust gas and water-separated anode exhaust is outputted to the anode exhaust path 7. Water that is separated in the knock out pot 11 is passed through the pump 14 which increases the pressure of the water. Separated and pressurized water is thereafter carried to the fuel supply path 6 via the water supply line 13. In addition, any excess water produced in the knock out pot 11 and the pump 14 may be exported from the system 1 through a connecting line 12.

In this illustrative embodiment, a common knock out pot and pump are suitable for use in the system 1 for separating and increasing the pressure of the water. As can be appreciated, other water transfer devices or assemblies, such as a partial-pressure swing water transfer device, a conventional enthalpy wheel humidifier, a cooling radiator, a membrane, a packed column or an absorber/stripper type system may be used in place of, or with the heat exchanger 10, knock out pot 11 and the pump 14 for transferring part or all of the water.

The water-separated anode exhaust exits the knock out pot 11 and comprises primarily hydrogen and CO fuel and $CO_2$ with trace amounts of water and unconverted hydrocarbons (typically methane). This water-separated anode exhaust gas is carried by the anode exhaust path 7 from the knock out pot 11 to a first coupling assembly 41A which is arranged to selectively couple the water-separated anode exhaust to a supply path 15 leading to the hydrogen utilization device 30 and to a supply path 16 leading to a second coupling assembly 41B. The second coupling assembly 41B is, in turn, arranged to selectively couple the water-separated anode exhaust in the supply path 16 to the optional storage device 32 through a connecting path 17 and to the optional export path 18. The optional storage device 32 is capable of outputting stored anode exhaust gas to the hydrogen utilization device 30 via a third coupling assembly 41C coupled to the hydrogen utilization device 30 through a connecting path 19.

In the illustrative embodiment shown in FIG. 1, the supply path 15 includes a fourth coupling assembly 41D for selectively coupling the water-separated anode exhaust gas in the supply path 15 to the hydrogen utilization device 30 and to a bypass path 20. The bypass path 20 bypasses the hydrogen utilization device 30 and is coupled with an oxidant gas path 24 carrying exhaust gas from the hydrogen utilization device 30. Bypassing a small amount of the water-separated anode exhaust gas may be useful in controlling the temperature of the oxidant gas to the cathode. It can also help reduce any NOx in the system exhaust gas by reacting hydrogen in the water-separated anode exhaust with NOx on the catalyst of the oxidizer, although the low btu/scf nature of the water-separated anode exhaust gas will suppress most of the NOx normally produced in an engine. Similarly, CO present in the hydrogen utilization device exhaust will also be reduced by the reaction of CO with $O_2$ on the catalyst of the oxidizer. Minimizing NOx and CO is important as NOx and CO are commonly regulated emissions from power plants.

The coupling assemblies 41A-D are controlled by a controller 41 of the control assembly 1A based on a power demand on the system. In particular, the control assembly 1A monitors and senses changes in the power demand of a variable load on the system 1, and the controller 41 of the assembly 1A controls the coupling assemblies 41A-D to provide desired gas coupling, and to thereby adjust the delivery of the water-separated anode exhaust gas, so as to meet the varying power demand of the variable load. This adjustment of the water-separated anode exhaust gas delivery can take on various forms depending on the desires of the user and the efficiencies sought to be realized in the system 1.

As discussed in more detail below, the exhaust from the hydrogen utilization device 30, either alone or in combination with bypassed water-separated anode exhaust from the bypass path 20, is used for supplying oxidant gas to the cathode compartment 4 of the fuel cell 2. Accordingly, in the illustrative embodiment of FIG. 1, the controller 41 controls the coupling assemblies 41A-D to selectively couple at least a portion of the water-separated anode exhaust gas in the path 7, and preferably a substantial portion of the water-separated anode exhaust, to the fourth coupling assembly 41D during the system's operation so as to provide a continuous supply of oxidant gas to the fuel cell cathode 4. For carbonate fuel cells, $CO_2$ must also be supplied to the fuel cell cathode 4.

When the power demand detected by the control assembly 1A is low and is below the output of the high temperature fuel cell 2 plus the output of the hydrogen utilization device, the controller 41 adjusts the coupling assemblies 41A-D so that supply of fuel from storage to the hydrogen utilization device is minimized and a substantial portion of the water-separated anode exhaust gas in the path 7 is coupled to the bypass path 20 and to one or more of the optional export path 18 or the optional storage device 32. When the power demand exceeds the output of the high temperature fuel cell 2, the controller 41 adjusts the coupling assemblies 41A-41D so that a sufficient portion of the water-separated anode exhaust gas in the path 7 is coupled to the hydrogen utilization device 30 for additional power production by the hydrogen utilization device 30, while the remaining portion of the water-separated anode exhaust gas is coupled to the bypass path 20, the export path 18 and/or the optional storage device 32. During high power demand, the controller 41 adjusts the coupling assemblies 41A-41D to couple a substantial portion or all of the water-separated anode exhaust gas to the hydrogen utilization device 30, and may further adjust the third assembly 41C to couple the optional storage device 32 to the hydrogen utilization device 30 to output additional fuel from the storage device 32 for additional power production. Supplemental fuel can be used and adjusted similarly to fuel from the storage device 32 described above.

As shown in FIG. 1 and as discussed above, all or a portion of the water-separated anode exhaust gas in the path 15 is passed from the coupling assembly 41A to the hydrogen utilization device 30. In certain illustrative embodiments, when pressurized fuel is not needed by the hydrogen utilization device, the water-separated anode exhaust gas in the path 15 is combined with oxidant gas in the form of air from an air supply path 21 before being provided to the hydrogen utilization device 30.

In certain embodiments, the hydrogen utilization device 30 is also supplied with supplemental fuel from a supplemental fuel supply (not shown) via a supplemental fuel supply path 22. The amounts of air from the air supply path 21 and of the supplemental fuel from the path 22 supplied to the hydrogen utilization device 30 are controlled by the controller 41 of the control assembly 1A based on the sensed power demand and the desired operation of the hydrogen utilization device 30. Thus, for example, when the sensed power demand is high, exceeding the power produced by the high temperature fuel cell 2, the controller 41 controls supplemental fuel to be supplied to the hydrogen utilization device 30 in order to produce sufficient power to satisfy the sensed demand. As shown, the supplemental fuel supplied to the hydrogen utilization device may be a combination of fuel from the storage device 32 and of the fuel from the supplemental fuel supply. When pressurized fuel is needed, pressurized supplemental fuel or pressurized water-separated anode exhaust gas from the storage device 32 may also be mixed with the air or injected separately into the hydrogen utilization device 30.

In the hydrogen utilization device 30, unspent hydrogen fuel in the water-separated anode exhaust and any supplemental fuel provided to the hydrogen utilization device 30 are burned in the presence of oxidant gas, i.e. air, to produce power and hydrogen utilization device exhaust gas. This exhaust gas, comprising primarily $N_2$, $CO_2$, $O_2$ and a small amount of unspent hydrocarbon fuel, is passed from the hydrogen utilization device 30 to the cathode oxidant gas path 24 leading to an inlet 4A of the cathode 4. As mentioned herein above, all or a portion of the water-separated anode exhaust gas may also bypass the hydrogen utilization device 30 via the bypass path 20 to be combined with the exhaust gas from the hydrogen utilization device 30 in the oxidant gas path 24.

The exhaust gas, or a mixture of the exhaust gas and the water-separated anode exhaust gas, in the path 24 is carried through an oxidizer 24A, in which any unburned hydrocarbons in the gas are oxidized to produce oxidant gas rich in $CO_2$ and $O_2$. The catalyst in the oxidizer or separate catalyst can also be used to reduce NOx in the exhaust gas from the hydrogen utilization device 30. The oxidant gas produced in the oxidizer 24A is then supplied to the cathode inlet 4A for the electrochemical reaction in the fuel cell 2. Cathode exhaust gas exits the cathode compartment 4 through a cathode outlet and is carried by a cathode exhaust path 28. As shown, cathode exhaust gas, or a portion thereof, may be recycled back to the cathode 4 via a recycle path 26 coupled to the connecting path 24, by combining the cathode exhaust gas with the oxidant gas carried by the path 24. In this embodiment, a cathode recycle blower 26A may be used to recycle the cathode exhaust portion in the recycle path 26. Cathode recycle is typically used during turndown of the unit to maintain the cathode flow rate at a level needed for good flow distribution and heat transfer.

The cathode exhaust that is not recycled back to the cathode compartment 4 is carried by the exhaust path 28 and is passed through the heat exchanges 6C and 6E, in which the cathode exhaust is cooled, thereby heating up the fuel in the path 6. The cooled cathode exhaust gas is then eliminated from the system 1 and/or used in further waste heat recovery. Thus, the heat energy stored in the cathode exhaust gas leaving the system 1 may be used in other applications, such as residential heating.

The system 1 shown in FIG. 1 results in significant improvements in operating and manufacturing efficiencies. In particular, when an internal combustion engine is used as the hydrogen utilization device 30 in the system, the overall efficiency of the system at was increased to about 51% as compared to about 47% overall efficiency of a conventional direct fuel cell system. A similar increase is expected if a steam turbine based bottoming cycle is used to recover the waste heat, an increase in the overall efficiency to about 59%, compared to about 54% for a conventional direct fuel system with a steam turbine. When waste heat recovery is employed in the system to capture all of the waste heat, the efficiency of the system 1 is increased up to about 74% as compared to about 67% overall efficiency of a conventional direct fuel cell system.

In addition, the cost of power production ($/kW) by the system 1 was reduced by approximately $400 to $1000/kW depending on the size of the system, resulting in a 10% to 25% reduction in the cost of power production. These improvements in the overall efficiency and in power production costs result from integrating the fuel cell with a low-cost engine as the hydrogen utilization device, e.g. internal combustion engine, as well as from using the hydrogen utilization device exhaust to provide oxidant gas for the fuel cell cathode, eliminating the need for an oxidant gas supply assembly. Additional efficiency improvements result from recycling of water from the anode exhaust to humidify the fuel carried to the anode.

The manufacturing costs of the system 1 are also reduced as compared to the conventional power production systems. In particular, the system 1 of FIG. 1 eliminates the need for an air blower and a heater for supplying and pre-heating the oxidant gas for use in the cathode compartment of the fuel cell since the hydrogen utilization device exhaust is already pre-heated to a suitable temperature. Additionally, the recycling of water from the anode exhaust gas to humidify the fuel passed to the anode compartment eliminates the requirement for a separate water supply and a water supply assembly.

Additional improvements of the system of FIG. 1 over the conventional direct fuel cell power plants include black start capability, load following capability, insensitivity to the fuel utilization levels and reduction in emissions from the power plant resulting from recycling of hydrogen utilization device exhaust. In particular, the system is capable of generating and exporting power during the heat-up of the fuel cell by operating the hydrogen utilization device for power production using supplemental fuel, thus providing black start capability. The load following capability of the system 1 is accomplished by changing the fuel to the hydrogen utilization device 30 and its power output. Typically, the hydrogen utilization system 30 is a device which can vary its power output quickly without any adverse effects. Load following can also be accomplished by varying and controlling the amount of fuel being sent to and the power output from the fuel cell 2. However, the output from the high temperature fuel cell must be changed slowly to avoid thermal stresses in the system. As mentioned above, the emissions from the hydrogen utilization device, and in particular NOx emissions, are reduced by running the hydrogen utilization device on the lean fuel from the fuel cell and by using the hydrogen utilization device exhaust to provide oxidant gas for the fuel cell cathode compartment 2 where NOx will be reduced. Because of the higher efficiency, $CO_2$ emissions are also reduced. Because all of the exhaust is from the high temperature fuel cell, other emissions (SOx, CO, NOx) are essentially unchanged from the normal near zero values of fuel cells.

As discussed above, the hydrogen utilization device 30 in FIG. 1 preferably comprises a CO tolerant engine, such as an internal combustion engine or a diesel engine. In other illustrative embodiments, the system employs other hydrogen utilization devices, such as a combustion turbine device, a recuperative turbine, or a microturbine as the hydrogen utilization device 30. In such embodiments, the components of the system, and the arrangement thereof, may vary, and additional components may be used, so as to achieve optimum efficiency. Illustrative embodiments of these embodiments are shown, respectively, in FIGS. 2-4.

FIG. 2 shows an illustrative embodiment of the fuel cell power production system of FIG. 1, which uses a combustion turbine 130 as the hydrogen utilization device. The operation of the system 100 in FIG. 2 and the supply and flow of fuel and other operating materials to the fuel cell and the hydrogen utilization device 130 are controlled using a control assembly 1A, as discussed in more detail below. For purposes of clarity and simplicity, the system 100 shown in FIG. 2 does not include the optional storage device 32 or the optional hydrogen export path 18. However, it is understood that the system 100 of FIG. 2 may be modified so as to include the storage device and/or the hydrogen export path, similar to the system 1 of FIG. 1.

As shown in FIG. 2, the system 100 includes a high-temperature fuel cell 102 which comprises an anode compartment 103 and a cathode compartment 104, separated by an electrolyte matrix 105. As in the system 1 of FIG. 1, fuel is supplied to a fuel supply path 106, which carries the fuel to an inlet 103A of the anode compartment 103. As shown, the fuel supply path 106 carries the fuel through a desulfurizer 106A to remove sulfur-containing compounds from the fuel, combines the fuel with water from a water transfer assembly 109 to humidify the fuel, and passes the humidified fuel through first and second heat exchangers 106B, 106C in which the water is vaporized and the fuel is pre-heated. As shown, the fuel is pre-heated in the first heat exchanger 106B by hot anode exhaust gas and in the second heat exchanger 106C by hot cathode exhaust gas. The fuel supply path 106 then carries the fuel through a deoxidizer/preconverter 106D and through a further heat exchanger 106E, in which the fuel is heated by the cathode exhaust, and thereafter supplies the processed pre-heated humidified fuel to the anode compartment 103 through the anode inlet 103A.

Anode exhaust gas, comprising unreacted hydrogen, carbon monoxide, water vapor, carbon dioxide and trace amounts of other gases, is outputted from the anode compartment 103 via an anode outlet 103B and is passed to an anode exhaust path 107. The anode exhaust in the exhaust path 107 is first cooled in the second heat exchanger 106B, heating up the fuel in the fuel supply path 106, and is thereafter passed to a water transfer assembly 109, in which water in the anode exhaust is separated from the remaining exhaust components. As shown, the water transfer assembly 109 in this embodiment is similar to the water transfer assembly 9 of FIG. 1, and includes a heat exchanger 110 for condensing the water in the anode exhaust gas, a knock out pot 111 for separating the water from the other components of the anode exhaust and outputting water-separated anode exhaust, and a pump 114 for pressurizing water separated from the anode exhaust. It is understood that other suitable water transfer devices or assemblies may be used for separating the water from the anode exhaust gas.

The water-separated anode exhaust gas, comprising primarily hydrogen and CO fuel and $CO_2$, with trace amounts of water and unconverted hydrocarbons, is carried from the water transfer assembly 109 via the anode exhaust path 107 to a coupling assembly 141A. The coupling assembly 141A is arranged to selectively couple the water-separated anode exhaust gas to a supply path 115 leading to the combustion turbine 130 and to a bypass path 120 which bypasses the combustion turbine 130.

As in FIG. 1, the coupling assembly 141A is controlled by a controller 141 of the control assembly 101A based on a sensed power demand. In particular, the controller 141 controls the coupling assembly 141A to selectively couple the water-separated anode exhaust gas in the path 107 to the path 115 at most times during the system's operation. If the detected power demand is, however, less than the power being produced by the fuel cell 102, the controller 141 controls the coupling assembly 141A to selectively couple the water-separated anode exhaust gas, or a portion thereof, in the path 107 to the bypass path 120.

As shown in FIG. 2, when the water-separated anode exhaust gas in the path 107 is coupled to the path 115, the water-separated anode exhaust is carried from the coupling assembly 141A to a compressor 127, which compresses the water-separated anode exhaust gas. The compressed water-separated anode exhaust gas is then carried from the compressor 127 to the combustion turbine 130. As shown, supplemental fuel may also be provided to the combustion turbine 130 from a supplemental fuel supply (not shown) via a connecting path 122. In particular, the compressed water-separated anode exhaust gas may be mixed with supplemental fuel from the connecting path 122 before being supplied to the turbine 130. If the supplemental fuel is supplied at low pressure, it may be added to the water-separated anode exhaust gas in line 115 (not shown) and compressed in the same compressor 127 as the water-separated anode exhaust gas. The supplemental fuel supplied through the connecting path 122 is also controlled by the controller 141 so as to regulate the power output of the hydrogen utilization device 30. Use of supplemental fuel provides great flexibility in the operation of the hydrogen utilization device as well as the overall system operation at very low cost. In addition, supplemental fuel may be required in some systems to increase the heating value of the water-separated anode exhaust so that it does not require catalytic combustion.

The combustion turbine 130 of FIG. 2 includes a compressor portion 130A, a combustor portion 130B and a turbine portion 130C. As shown, the compressor portion 130A receives oxidant gas in the form of air from an air supply path 121 and compresses it. The combustor portion 130B of the turbine 130 receives fuel comprising the water-separated anode exhaust or the mixture of water-separated anode exhaust and supplemental fuel from the supply path 115 and burns the received fuel so as to heat the compressed air, compressed by the compressor portion 130A. The turbine portion 130C then extracts power from the compressed hot air flow and outputs the extracted power and a low pressure turbine exhaust gas comprising $N_2$, $O_2$, $CO_2$, $H_2O$ and any unburned hydrocarbons.

The turbine exhaust gas outputted by the turbine 130 is passed to a cathode oxidant gas supply path 124. The turbine exhaust gas or a mixture of the turbine exhaust, and any water-separated anode exhaust gas bypassed through the path 120, is carried by the supply path 124 to an oxidizer 124A in which any unburned hydrocarbons in the gas are oxidized to produce oxidant gas rich in $CO_2$ and $O_2$. The resulting oxidant gas is then supplied to a cathode inlet 104A for use in the cathode compartment 104 of the fuel cell 102. The cathode compartment 104 outputs hot cathode exhaust, comprising spent oxidant gas, through a cathode outlet 104B, which is then carried by a cathode exhaust path 128 through the heat exchangers 106C and 106E so as to cool the cathode exhaust and to provide heating for the fuel in the fuel supply path 106. Cooled cathode exhaust gas then exits the system 100 and may be further used for additional heat recovery.

As shown, a portion of the cathode exhaust in the exhaust path 128 may be recycled back into the cathode compartment 104 via a cathode recycle path 126, which includes a recycle blower 126A. Recycled cathode exhaust gas in the recycle path 126 is combined with the oxidant gas in the path 124 before being provided to the cathode inlet 104A.

Another illustrative embodiment of the fuel cell power production system of FIG. 1 is shown in FIG. 3, in which the system 200 uses a recuperative turbine 230 as the hydrogen utilization device. In this embodiment, similar reference numbers are used to denote components that are similar to those shown in FIGS. 1 and 2. In the operation of the system 200 in FIG. 3, the supply and the flow of fuel and other operating materials to the fuel cell and the hydrogen utilization device 230 are controlled using a control assembly 1A. As in FIG. 2, the optional storage device and the optional export path, and associated system components therewith, have been omitted from FIG. 3 for purposes of clarity and simplicity. However, it is understood that the system 200 of FIG. 3 may be modified to include the storage device and/or the export path, similar to the system 1 of FIG. 1. The use of the recuperative turbine 230 can be expected to improve the efficiency of the system by around 6% when waste heat is not recovered, and by about 1% when waste heat is recovered by a steam turbine bottoming cycle.

As in the previous embodiments discussed herein above and shown in FIGS. 1 and 2, the system 200 includes a fuel cell 202 comprising an anode compartment 203 and a cathode compartment 204 separated by an electrolyte matrix 205. In this illustrative embodiment, fuel supplied from a fuel supply (not shown) to the anode compartment 203 is pre-heated using only cathode exhaust in heat exchangers 206C and 206E. As shown in FIG. 3, fuel is carried by a fuel supply path 206 which supplies the fuel to the anode 203 compartment. In the fuel supply path 206, the fuel is desulfurized in a desulfurizer 206A and thereafter combined with water from a water transfer assembly 209 to produce humidified fuel. As shown, the humidified fuel is pre-heated by cathode exhaust gas in the heat exchanger 206C, then deoxidized in a deoxidizer/preconverter 206D, which removes any trace oxygen and heavy hydrocarbon contaminants from the fuel, and again pre-heated by the cathode exhaust gas in another heat exchanger 206E. Pre-heated fuel is then provided from the heat exchanger 206E to the anode compartment 203 through an anode inlet 203A.

Fuel gas provided to the anode compartment 203 undergoes an electrochemical reaction to produce power and anode exhaust. Anode exhaust gas is outputted by the anode compartment 203 through an anode outlet 203B to an anode exhaust path 207, which carries the anode exhaust to the water transfer assembly 209 and then to the recuperating turbine 230. As discussed in more detail herein below, the recuperating turbine 230 includes a recuperator 231 which recovers heat from the anode exhaust and the cathode exhaust gas for use in the recuperating turbine. As shown in FIG. 3, before being carried to the water transfer assembly 209, anode exhaust gas in the exhaust path 207 is passed through the recuperator 231 of the turbine 230 in which heat is recovered from the anode exhaust, thus cooling the exhaust. Cooled anode exhaust is then carried by the exhaust path 207 to the water transfer assembly 209 which has a similar construction to the water transfer assemblies 9 and 109 shown in FIGS. 1 and 2. As shown, the water transfer assembly 209 includes a heat exchanger 210, a knock out pot 211 and a pump 214, which condense, separate the water from the anode exhaust gas and pressurize the water, respectively. The knock out pot 211 also outputs water-separated anode exhaust comprising the remaining components of the anode exhaust. It is understood that any other suitable water transfer device or assembly, may be used instead of the assembly 209 shown in FIG. 3.

As shown in FIG. 3, water separated from the anode exhaust gas is passed to a water supply path 213 which provides water to the fuel supply path 206 to humidify the fuel. In certain embodiments, excess water is produced by the water transfer assembly 209 and is carried out of the system 200 via a connecting path 212. Water-separated anode exhaust gas, which comprises primarily hydrogen, CO, and $CO_2$ and trace amounts of water and unconverted hydrocarbons, is carried from the water transfer assembly 209 by the anode exhaust path 207 to a coupling assembly 241A. As in the embodiments shown in FIGS. 1 and 2, the coupling assembly 241A is controlled by a controller 241 of the control assembly 200A to selectively couple the water-separated anode exhaust to a supply path 215 leading to the recuperative turbine 230 and to a bypass path 220 which bypasses the turbine 230.

Water-separated anode exhaust gas selectively coupled by the coupling assembly 241A to the supply path 215 is carried to a compressor 227 in which the water-separated anode exhaust is compressed, and is thereafter provided to the turbine 230. Compressed water-separated anode exhaust may also be mixed with supplemental fuel supplied via a supplemental fuel supply path 222 before being provided to the turbine.

As shown in FIG. 3, the recuperative turbine 230 includes a compressor portion 230A, a combustor portion 230B, a turbine portion 230C and the recuperator 231. The compressor portion 230A receives oxidant gas in the form of air from an air supply path 221 and compresses the air, while the combustor portion 230B receives fuel comprising the water-separated anode exhaust or a mixture of the water-separated anode exhaust and the supplemental fuel, and burns the received fuel so as to heat the compressed air. As mentioned herein above, the recuperator 231 recovers heat energy from the anode exhaust gas and from the cathode exhaust gas to provide additional heat to the compressed air. The turbine portion 230C then extracts and outputs power from the heated compressed air. Use of the recuperative turbine 230, which includes the recuperator 231, results in additional efficiencies and production of power as a result of recovery of heat energy from the fuel cell exhaust gases.

As shown, the recuperative turbine 230 outputs a turbine exhaust gas which comprises primarily $N_2$, $CO_2$, $O_2$ and any unburned hydrocarbons. This turbine exhaust gas is passed to the cathode oxidant gas path 224, which carries the turbine exhaust, or a mixture of turbine exhaust and bypassed anode exhaust from the bypass path 220, through an oxidizer 224A to oxidize any unburned hydrocarbons in the exhaust and to produce oxidant gas rich in $CO_2$ and $O_2$, suitable for use in the fuel cell cathode 204. The oxidant gas is provided to the cathode compartment 204 through a cathode inlet 204A.

Hot cathode exhaust outputted by the cathode 204 through a cathode outlet 204B is carried by a cathode exhaust path 228 through heat exchangers 206C and 206E to cool the cathode exhaust and to pre-heat the fuel in the fuel supply path 206. After being cooled in the heat exchangers 206C and 206E, cathode exhaust is passed to the recuperator 231 in which heat energy remaining in the exhaust is recovered by further cooling the cathode exhaust. After passing through the recuperator 231, the cathode exhaust is carried out of the system 200. In addition, as in the systems 1 and 100 of FIGS. 1 and 2, a portion of the cathode exhaust in the exhaust path 228 may be recycled back to the cathode 204. Cathode recycle path 226, which includes a cathode recycle blower 226A, carries the recycled cathode exhaust to the path 224, in which the recycled cathode exhaust is combined with the oxidant gas from the oxidizer 224A.

The fuel cell power production systems shown in FIGS. 1-3 may also be modified for use with a microturbine as the hydrogen utilization device, using configurations similar to those shown in FIGS. 2 and 3.

Alternate methods of heat recovery may be used as shown in FIG. 4. An illustrative embodiment of the fuel cell power production system 300 using a turbine such as a microturbine 330 as the hydrogen utilization device is shown in FIG. 4. As shown, the power production system 300 includes a high temperature fuel cell 302 integrated with the microturbine 330, and the operation of the system 300 and the supply and flow of fuel and other operating materials to the fuel cell 302 and the microturbine 330 are controlled using a control assembly 300A, as discussed in more detail below. For purposes of clarity and simplicity, the system 300 of FIG. 4 does not include the optional storage device 32, the optional hydrogen export path 18 or the bypass path for bypassing the microtubine. However, it is understood that the system 300 may be modified so as to include these features, and components associated therewith, similar to the system 1 of FIG. 1.

As shown in FIG. 4, the fuel cell production system 300 includes the high-temperature fuel cell 302, which comprises an anode compartment 303 and a cathode compartment 304 separated by an electrolyte matrix 305. The anode compartment 303 of the fuel cell 302 is supplied with fuel from a fuel supply (not shown) carried by a fuel supply path 306. As shown, fuel carried in the fuel supply path 306 is desulfurized in a desulfurizer 306A and then combined with water and pre-heated in a humidifying heat exchanger 306C. The heat exchanger 306C also receives recycled water from a water supply path 313, as discussed in more detail herein above, and the pre-heating of the fuel and water mixture is accomplished by passing cathode exhaust gas through the heat exchanger 306C to recover heat energy stored in the cathode exhaust. The humidified fuel is passed through another heat exchanger 306B, in which the fuel is further pre-heated by recovering heat from anode exhaust gas and thereafter deoxidized in a deoxidizer/preconverter 306D, which removes any trace oxygen and heavy hydrocarbon contaminants from the fuel. Deoxidized fuel is then supplied to the anode 303 through an anode inlet 303A.

In the anode compartment, fuel undergoes an electrochemical reaction and spent fuel leaves the anode compartment 303 through an anode outlet 303B as anode exhaust gas. Anode exhaust gas is carried by an anode exhaust path 307 from the anode outlet 303B, and is passed through heat exchangers 307A and 306B to cool the anode exhaust before carrying the exhaust to a water transfer assembly 309. In this illustrative embodiment, the water transfer assembly 309 includes a cooling radiator 309A which condenses out and separates the water from the anode exhaust gas, and a pump 309B, which increases the pressure of the water separated by the cooling radiator 309A. Water separated by the transfer assembly 309 is then carried out by the water supply path 313 and provided to the humidifying heat exchanger 306C. The cooling radiator 309A also outputs water-separated anode exhaust comprising remaining components of the anode exhaust, i.e. hydrogen, $CO_2$ and trace amounts of water and CO.

It is understood that the configuration of the water transfer assembly 309 is not limited to the arrangement shown in FIG. 4. For example, the water transfer assembly shown FIGS. 1-3 or any other suitable water transfer device or assembly may be used in place of the water transfer assembly 309 shown in FIG. 4. Moreover, although not shown in FIG. 4 for purposes of clarity and simplicity, excess water may be exported out of the system 300 via a water exhaust path.

The water-separated anode exhaust gas is carried out of the water transfer assembly 309 by the anode exhaust path 307. In certain illustrative embodiments, supplemental fuel from a supplemental fuel supply (not shown) is added to the water-separated anode exhaust gas via a supplemental fuel supply path 322. The amount of supplemental fuel added to the water-separated anode exhaust gas is controlled by a controller 341 of the control assembly 300A based on a detected power demand, such that no supplemental fuel is added during low power demands exceeded by the power produced by the fuel cell 302 and a pre-selected amount of supplemental fuel is controlled to be added to the water-separated anode exhaust during higher power demands. The water-separated anode exhaust, or the mixture of water-separated anode exhaust and supplemental fuel, is carried to an anode boost compressor 327 which compresses it, and thereafter to the heat exchanger 307A in which the compressed water-separated anode exhaust, or the mixture of water-separated anode exhaust and supplemental fuel, is heated by the hot exhaust gas from the anode 303.

The compressed heated water-separated anode exhaust gas, or the compressed heated the mixture of water-separated anode exhaust and supplemental fuel, is then carried to an oxidizer 325, which also receives compressed pre-heated oxidant gas in the form of air from a supply path 321. In particular, air is supplied from the path 321 to a compressor portion 330A of the microturbine 330, in which the air is compressed, and the compressed air is further heated in a heat exchanger 328A by the cathode exhaust. Further heating of the compressed air may be done by a start-up heater 321A, but normally the heater is used only when starting the turbine in a configuration where supplemental fuel is unavailable. The compressed heated air is then combined with the water-separated anode exhaust, or the mixture of water-separated anode exhaust and supplemental fuel, in the oxidizer 325, which oxidizes the resulting mixture to produce hot compressed oxidant gas. A turbine portion 330B of the microturbine 330 then extracts power from the hot compressed gas produced in the oxidizer and outputs the extracted power and microturbine exhaust gas comprising primarily $CO_2$ and $O_2$. In cases where the fuel cell is operated at high fuel utilization and no supplemental fuel is used to maximize efficiency, the water-separated anode exhaust gas may be very low in heat content and require the oxidizer 325 to include a catalyst to promote the complete combustion of the water-separated anode exhaust gas.

Microturbine exhaust gas, comprising oxidant gas suitable for use in a fuel cell, is carried by a cathode oxidant gas path 324 from the microturbine 330 to the cathode compartment 304 through a cathode inlet 304A. After passing through the cathode 304, a high-temperature cathode exhaust gas comprising spent oxidant gas is outputted from the cathode 304 through a cathode outlet 304B into a cathode exhaust path 328. This cathode exhaust gas is cooled by passing through the heat exchanger 328A, which pre-heats compressed air leaving the compressor portion 330A of the microturbine, and is thereafter further cooled in a humidifying heat exchanger, which pre-heats and humidifies fuel in the fuel supply path 306. Cooled cathode exhaust is then exported out of the system 300 and may be used in further heat recovery.

As in the other embodiments discussed herein above, a portion of the cathode exhaust gas may be recycled back to the cathode 304 via a cathode recycle path 326, which includes a recycle blower 326A. Recycled cathode exhaust is combined with the oxidant gas in the path 324 before being provided to the cathode inlet 304A.

The above described embodiments shown in FIGS. 2-4 result in similar efficiencies and improvements as the system 1 shown in FIG. 1. The embodiments shown in FIGS. 2-4, like the system of FIG. 1, eliminate the need for an oxidant gas supply assembly and for a water supply assembly by using the hydrogen utilization device exhaust to provide oxidant gas to the cathode and by recycling water in the anode exhaust to the fuel. In addition, the embodiments of FIGS. 2-4 effectively recover heat from the anode and the cathode exhaust gases produced by the fuel cell thus reducing the need for independent heating devices.

Figure 5:
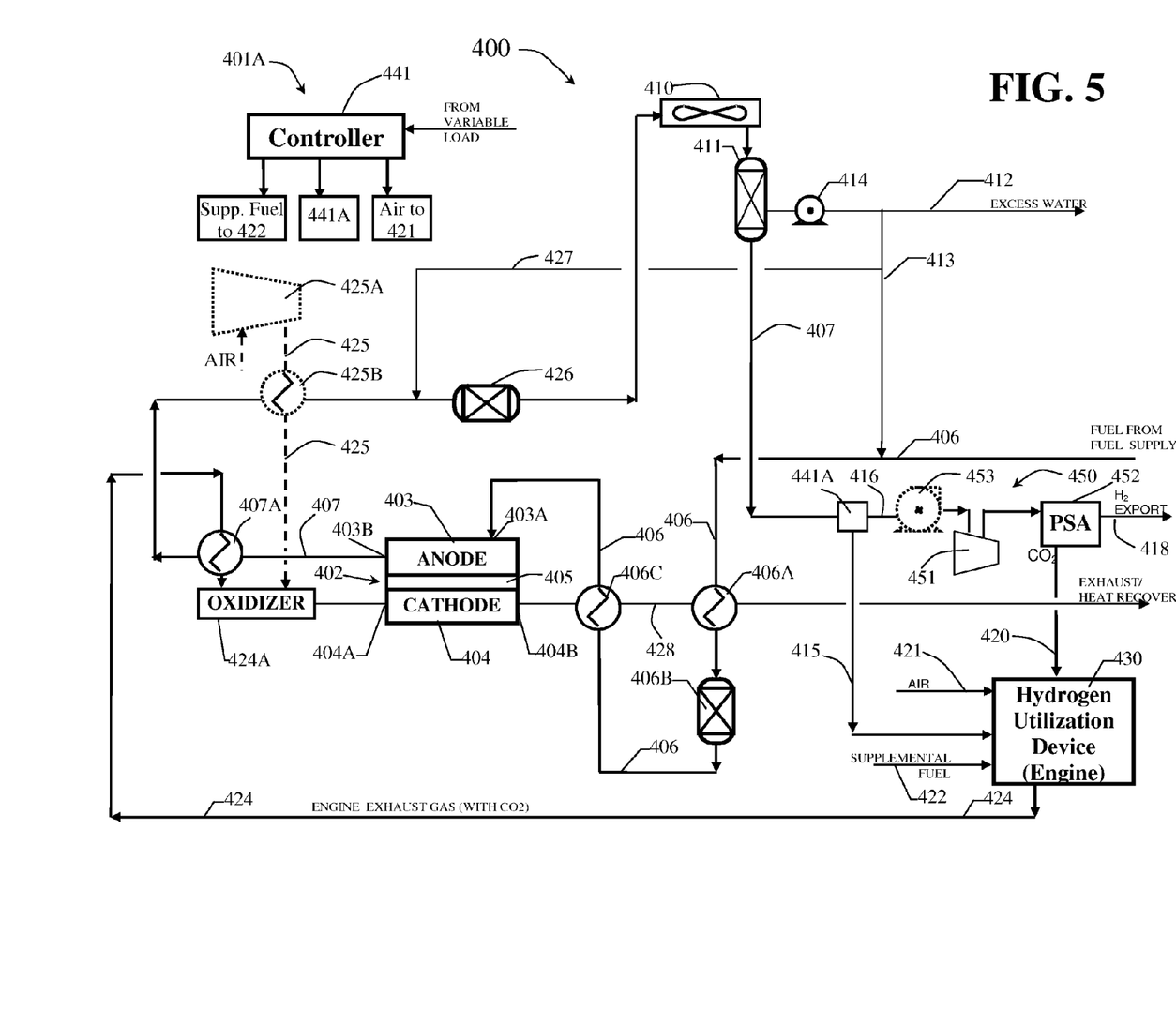
FIG. 5 shows another embodiment of the fuel cell power production system of FIG. 1 including additional components for extracting and exporting hydrogen fuel from the anode exhaust gas.

The fuel cell power production system of FIG. 1 may be further modified for increased hydrogen production for use by the system or for export out of the system. FIG. 5 shows such modified fuel cell power production system 400 which includes additional components for extracting and exporting hydrogen fuel from the anode exhaust gas.

As shown in FIG. 5, the system 400 comprises a high-temperature fuel cell 402 and a hydrogen utilization device 430. In this illustrative embodiment, the high-temperature fuel cell 402 is a carbonate fuel cell and the hydrogen utilization device 430 is a low-temperature $CO_2$ and CO tolerant engine, such as an internal combustion engine. It is understood that other types of high-temperature fuel cells and other types of hydrogen utilization devices is contemplated within the scope of the invention. The fuel cell power production system 400 of FIG. 5 also includes a shift reactor 426 to convert CO in anode exhaust to $H_2$ and a water transfer assembly 409 for transferring water in anode exhaust and for outputting water-separated anode exhaust and a hydrogen transfer assembly 450 for transferring hydrogen from the water-separated anode exhaust an export path 418 for exporting separated hydrogen out of the system 400. As discussed herein below, the operation of the fuel cell power production system 400 and the flow of fuel and air to the fuel cell and the hydrogen utilization device are controlled using a control assembly 401A.

As shown in FIG. 5, the high-temperature fuel cell 402 of the system 400 comprises an anode 403 and a cathode 404, separated by an electrolyte matrix 405. A hydrocarbon-containing fuel is supplied from a fuel supply (not shown for purposes of clarity and simplicity) to a fuel supply path 406 which carries the fuel to an inlet 403A of the anode 403. In particular, the fuel carried by the fuel supply path 406 is combined with water from a water supply path 413 to humidify the fuel, which prevents formation of carbon deposits in the high temperature fuel cell system, and is thereafter pre-heated by cathode exhaust in a first heat exchanger 406A. Pre-heated humidified fuel is carried by the supply path 406 through a processing assembly 406B, which includes a de-oxidizer/preconverter unit for removing any trace oxygen contaminants and heavy hydrocarbons from the fuel, and is thereafter carried through a second heat exchanger 406C in which the fuel is further pre-heated by the cathode exhaust before being supplied to the anode inlet 403A.

Fuel entering the anode 403 undergoes an electrochemical reaction in the anode 403 with oxidant gas in the cathode 404 to produce electrical power and anode exhaust gas. Anode exhaust gas is outputted from the anode 403 through an anode outlet 403B into an anode exhaust path 407. The anode exhaust in the path 407 comprises unreacted hydrogen, carbon monoxide, water vapor, carbon dioxide and trace amounts of other gases. Anode exhaust gas carried by the path 407 is first mixed with water from path 427 to partially cool the anode exhaust before passing the anode exhaust to the shift reactor 426. Cooling of the anode exhaust gas prior to passing it to the shift reactor 426 is desired so that the equilibrium shift composition favors the conversion of CO to $H_2$. Cooling may also be done by a heat exchanger such as a heat exchanger 425B. It is understood that although shifting of the gas is not required, it increases the amount of hydrogen which can be exported. After passing through the shift reactor 426, the anode exhaust is carried to a water transfer assembly 409.

Because exporting of hydrogen and water-separated anode exhaust removes heat from the system in the form of fuel, integrating the hydrogen transfer assembly into a system with a hydrogen utilization device which uses supplemental fuel allows for an increased amount of hydrogen export without being limited by the heat available since additional heat is provided by the waste heat of the supplementally fueled hydrogen utilization device.

The water transfer assembly 409 in this illustrative embodiment includes a heat exchanger 410, a water knock-out pot 411, and a water pump 414. Anode exhaust gas supplied to the water transfer assembly 409 is first cooled in the heat exchanger 410 to condense the water present in the anode exhaust, and a mixture of water and a gas comprising the remaining components of the anode exhaust is passed to the water knock-out pot 411, in which water is separated from the gas and water-separated anode exhaust is outputted to the anode exhaust path 407. Water that is separated from the anode exhaust flows to the water pump 414 which increases the pressure of the water and is thereafter recycled to the fuel cell in the path 406 by passing the separated water to the water supply path 413 as needed, with excess water being exported via a path 412. Part of the water is also recycled to cool the anode exhaust gas before passing the anode exhaust to the shift unit 426 using the path 427. The amount of water recycled to the path 427 is adjusted to provide the desired inlet temperature of the anode exhaust to the shift unit. The arrangement of the water transfer assembly 409 is not limited to the arrangement shown, and other suitable water transfer devices or assemblies, such as a packed column, may be used in place of the water knock-out pot and the water pump shown in FIG. 5.

As shown, the water-separated anode exhaust, which comprises primarily hydrogen fuel and $CO_2$ with trace amounts of water and CO, exits the water knock-out pot 411 of the water transfer assembly 409 and is carried by the anode exhaust path 407 to a first coupling assembly 441A. The first coupling assembly 441A is arranged to selectively couple the anode exhaust gas to a supply path 415 leading to the hydrogen utilization device 430 and to a supply path 416 leading to the hydrogen transfer assembly 450. The coupling assembly 441A is controlled by a controller 441 of the control assembly 401A based on a power demand of the system. In particular, the control assembly 401A monitors and senses changes in the power demand of a variable load on the system 400, and the controller 441 of the assembly 401A controls the coupling assembly 441A to provide desired gas coupling, and to adjust the delivery of the anode exhaust gas, so as to meet the varying power demand of the variable load.

In particular, when the power demand detected by the control assembly 401A is low, and in particular when the power demand is below the power output of the high-temperature fuel cell 402, the controller 441 adjusts the coupling assembly 441A so that a substantial portion of the anode exhaust gas in the path is coupled to the hydrogen transfer assembly 450 via the path 416. In this way, a substantial portion of the anode exhaust gas is used for production of hydrogen for future use by the system or for export from the system. During high power demand, the controller 441 adjusts the coupling assembly 441A to couple a substantial portion or all of the anode exhaust gas to the hydrogen utilization device 430 through the path 415, so that the hydrogen in the anode exhaust is used in the hydrogen utilization device 430 for power production.

As shown in FIG. 5 and discussed above, all or a portion of the anode exhaust gas in the path 407 is passed from the coupling assembly 441A to the hydrogen utilization device 430. In certain illustrative embodiments, the hydrogen utilization device 430 is also supplied with oxidant gas in the form of air from an air supply path 421 in order to achieve a desired gas composition in the device 430. As in the system of FIG. 1, in the present illustrative embodiment, it is desired to operate the hydrogen utilization device 430 using a lean mixture so as to reduce production of NOx as a byproduct of combustion in the device and to reduce emissions from the device 430. To accomplish lean operation of the device 430, the controller 441 controls the supply of air to the device 430 such that a sufficient amount of air is added from the air supply path 421 to the hydrogen utilization device 430.

In certain illustrative embodiments, especially when maximizing the amount of hydrogen exported, the hydrogen utilization device 430 is also provided with supplemental fuel from a supplemental fuel supply (not shown) through a supplemental fuel supply path 422. The amounts of air from the air supply path 421 and of the supplemental fuel from the supply path 422 supplied to the hydrogen utilization device 430 are controlled by the controller 441 of the control assembly 401A based on the sensed power demand and the desired operation of the hydrogen utilization device 430. For example, when the sensed power demand is high, the controller 441 controls the amount of supplemental fuel to be supplied to the hydrogen utilization device 430 so as to produce sufficient power to satisfy the sensed demand. Although not shown in FIG. 5, the supplemental fuel supplied to the device 430 may comprise hydrogen separated by the hydrogen transfer assembly 450.

As also shown in FIG. 5 and mentioned herein above, a portion of the water-separated anode exhaust in the anode exhaust path 407 is also passed the hydrogen transfer assembly 450 through the connecting path 416. The hydrogen transfer assembly 450 in the present illustrative embodiment comprises a compressor 451 for compressing the water-separated anode exhaust in the path 416, and a partial swing adsorption (PSA) assembly 452 for separating and transferring hydrogen from the water-separated anode exhaust gas and outputting hydrogen-separated anode exhaust. In the illustrative embodiment shown in FIG. 5, the hydrogen transfer assembly 450 also includes an anode exhaust blower 453 for supplying the water-separated anode exhaust to the compressor 451 of the transfer assembly 450.

As shown, the portion of the water-separated anode exhaust selectively coupled by the coupling assembly 441A to the path 416 is provided to the compressor 451 of the transfer assembly 450 using the anode exhaust blower 453. The compressor 451 compresses the water-separated anode exhaust and outputs the compressed water-separated anode exhaust to the PSA assembly 452 which separates and transfers the hydrogen from the water-separated anode exhaust to the hydrogen export path 418. Hydrogen transferred to the hydrogen export path 418 is then exported out of the system. As mentioned above, hydrogen from the export path 418 may be supplied to the hydrogen utilization device 430 when the power demand is high.

The hydrogen-separated anode exhaust, comprising primarily $CO_2$ gas, is outputted by the PSA unit 452 into a connecting path 420. As shown in FIG. 5, the connecting path 420 is coupled with the hydrogen utilization device 430 so that the hydrogen-separated anode exhaust is supplied to the hydrogen utilization device 430.

In the hydrogen utilization device 430, unspent hydrogen in the water-separated anode exhaust from the connecting path 415 and in the supplemental fuel supplied to the device 430 are burned in the presence of oxidant gas, i.e. air, and $CO_2$ provided from the air supply path 421 and from the connecting path 420 to produce power and hydrogen utilization device exhaust gas comprising primarily $N_2$, $O_2$, $H_2O$, $CO_2$, and a small amount of unspent hydrocarbon fuel. This hydrogen utilization device exhaust is passed from the hydrogen utilization device 430 to a cathode oxidant path 424 which leads to an inlet 404A of the cathode 404.

The device exhaust gas in the cathode oxidant path 424 is carried by the path 424 to an oxidizer 424A. In certain embodiments, additional oxidant gas in the form of air may also be provided to the oxidizer 424A via a supply path 425. In such embodiments, the additional oxidant gas in the supply path 425 is first compressed by a compressor 425A and pre-heated using anode exhaust in the heat exchanger 425B. The compressed and pre-heated additional oxidant gas is then provided to the oxidizer 424A. In the oxidizer 424A, any unburned hydrocarbons in the hydrogen utilization device exhaust are oxidized to produce oxidant gas rich in $CO_2$ and $O_2$. This oxidant gas is then carried by the path 424 to the cathode inlet 404A for the electrochemical reaction in the fuel cell 402.

The cathode 404 outputs cathode exhaust through a cathode outlet 404B to a cathode exhaust path 428. The cathode exhaust in the exhaust path 428 is passed through the second heat exchanger 406C and then through the first heat exchanger 406A to cool the cathode exhaust and to pre-heat the fuel in the fuel supply path 406. Cooled cathode exhaust gas is then eliminated from the system 400 and may be used in further waste heat recovery.

Although for purposes of clarity and simplicity, the system 400 shown in FIG. 5 does not include a storage device for storing anode exhaust gas or separated hydrogen for future use, a bypass path for bypassing the hydrogen utilization device 430, or a cathode recycle path for recycling a portion of the cathode exhaust to the cathode 404, it is understood that the system 400 of FIG. 5 may be modified so as to include these features, similar to the system 1 of FIG. 1.

In all cases it is understood that the above-described arrangements are merely illustrative of the many possible specific embodiments which represent applications of the present invention. For example, the hydrogen utilization device is not limited to the types described herein, and other devices, such as a diesel engine, may be suitable for use in the power production system. Moreover, additional components may be required to achieve a desired composition of the gas supplied to the hydrogen utilization device and for optimum power production. Thus, for example, if a diesel engine is used as the hydrogen utilization device, a high-pressure, sulfur-free supplemental fuel may be needed for optimum operation, and thus, a compressor and a desulfurizer may be used to pressurize the supplemental fuel and to remove sulfur-containing compounds present in the fuel before supplying it to the engine. In some embodiments, an Organic Rankine Cycle (ORC) system may be used in the power production system to recover additional heat from the fuel cell exhaust gases by using hot exhaust gases to heat up the organic working fluid of the ORC system. In some embodiments, a steam turbine bottoming cycle system may be used in the power production system to recover additional heat from the fuel cell exhaust gases by using hot exhaust gases to generate steam, which is the working fluid of the steam turbine system. Numerous and varied other arrangements can be readily devised in accordance with the principles of the present invention without departing from the spirit and scope of the invention.

What is claimed is:

1. A fuel cell power production system for supplying power to a load, comprising:
   a high-temperature fuel cell including an anode compartment, adapted to receive fuel from a fuel supply path and to output anode exhaust, and a cathode compartment adapted to receive oxidant gas and to output cathode exhaust;
   a water transfer assembly for transferring water in said anode exhaust and for outputting water-separated anode exhaust; and
   a hydrogen utilization device adapted to receive oxidant gas and one of said water-separated anode exhaust and gas derived from said water-separated anode exhaust and to output hydrogen utilization device exhaust including oxidant gas,
   wherein said hydrogen utilization device comprises one of an internal combustion engine, a diesel engine, a combustion turbine, a recuperative turbine, a microturbine and a low-temperature $CO_2$ and CO tolerant engine, and
   wherein said hydrogen utilization device exhaust is used to provide oxidant gas to said cathode.

2. A fuel cell power production system in accordance with claim 1, wherein one or more of:
   said water transfer assembly transfers a part or all of said water to said fuel supply path;
   said high-temperature fuel cell is a carbonate fuel cell;
   said fuel cell power production system further comprises a cathode exhaust recycle path for recycling a portion of said cathode exhaust to said cathode; and
   said water transfer assembly comprises one of (a)-(g), wherein:
   (a) a heat exchanger for condensing water in said anode exhaust, a knockout pot following said heat exchanger for separating water from said anode exhaust and a pump for increasing pressure of the separated water;
   (b) a partial-pressure swing water transfer device;
   (c) an enthalpy wheel humidifier;
   (d) a cooling radiator;
   (e) a membrane;
   (f) a packed column; and
   (g) an absorber/stripper system.

3. A fuel cell power production system in accordance with claim 1, wherein one of:
   (a) said hydrogen utilization device is further adapted to receive at least one of supplemental fuel and oxidant gas in the form of air
   (b) said hydrogen utilization device is further adapted to receive at least one of supplemental fuel and oxidant gas in the form of air, and said fuel cell power production system further comprises a control assembly responsive to variations in said load and adapted to control at least one of said supplemental fuel and said oxidant gas provided to said hydrogen utilization device; and (c) said hydrogen utilization device is further adapted to receive at least one of supplemental fuel and oxidant gas in the form of air, said fuel cell power production system further comprises a control assembly responsive to variations in said load and adapted to control at least one of said supplemental fuel and said oxidant gas provided to said hydrogen utilization device and said fuel in said fuel path is preheated using at least one of said cathode exhaust and said anode exhaust.

4. A fuel cell power production system in accordance with claim 3, further comprising one of:
(A) an oxidizer assembly for oxidizing and pre-heating said hydrogen utilization device exhaust to output a hot oxidant gas, said oxidizer assembly being adapted to use hydrogen in said water-separated anode exhaust to react with and reduce any NOx in said hydrogen utilization device; and
(B) an oxidizer assembly for oxidizing and pre-heating said hydrogen utilization device exhaust to output a hot oxidant gas, said oxidizer assembly being adapted to use hydrogen in said water-separated anode exhaust to react with and reduce any NOx in said hydrogen utilization device and at least one of (1), (2) and (3), wherein:
  (1) a bypass path for passing a part or all of said water-separated anode exhaust to said oxidizer without providing said water-separated anode exhaust to said hydrogen utilization device, wherein said control assembly is further adapted to selectively couple said water-separated anode exhaust from said water transfer assembly to at least one of said hydrogen utilization device and said bypass path;
  (2) a storage device, wherein said control assembly is further adapted to selectively couple a portion of said water-separated anode exhaust to said storage device to selectively couple said water-separated anode exhaust from said storage device to said hydrogen utilization device; and
  (3) an export path, wherein said control assembly is further adapted to selectively couple a portion of said water-separated anode exhaust to said export path.

5. A fuel cell power production system in accordance with claim 4, wherein said control assembly includes:
a controller responsive to variations in said load;
a coupling unit responsive to said controller for selectively allowing portions of said water-separated anode exhaust to be conveyed to said hydrogen utilization device, said storage device, said export path and said bypass path, wherein at least a portion of said water-separated anode exhaust is coupled to at least one of said hydrogen utilization device and said bypass path, and for selectively allowing at least a portion of the anode exhaust in said storage device to be coupled to the hydrogen utilization device.

6. A fuel cell power production system in accordance with claim 5, wherein said system further comprises an anode exhaust path for carrying said water-separated anode exhaust; a first recycle path, a second recycle path, a hydrogen utilization device input path, a storage device input path, a storage device output path, the bypass path and the export path;
said coupling unit comprises: a first coupling assembly arranged to selectively couple said water-separated anode exhaust in said anode exhaust path to said first recycle path and said second recycle path; a second coupling assembly arranged to selectively couple said water-separated anode exhaust in said second recycle path to said export path and storage device input path; a third coupling assembly arranged to couple anode exhaust in said storage device to said hydrogen utilization device input path; and a fourth coupling assembly arranged to selectively couple said water-separated anode exhaust in said first recycle path to said hydrogen utilization device input path and said bypass path; and
said controller controls said first through fourth coupling assemblies such that:
at least a portion of said water-separated anode exhaust is coupled to said first recycle path at all operating times;
when said load exhibits a low power demand, a portion of said water-separated anode exhaust is coupled to at least one of said bypass path and said second recycle path; and
when said load exhibits a high power demand, said water-separated anode exhaust is coupled to said first recycle path and said hydrogen utilization device input path, and a portion of said anode exhaust in said storage device is coupled to said storage device output path.

7. A fuel cell power production system in accordance with claim 6, wherein said hydrogen utilization device is further adapted to receive supplemental fuel, said controller controlling supply of said supplemental fuel to said hydrogen utilization device, such that when said load exhibits a low power demand, no supplemental fuel is supplied to said hydrogen utilization device, and when said load exhibits a high power demand, an increased amount of supplemental fuel is supplied to said hydrogen utilization device to satisfy said high power demand.

8. A fuel cell power production system in accordance with claim 4, further comprising a compressor adapted to receive and to compress oxidant gas, a heat exchanger for pre-heating said compressed oxidant gas using said anode exhaust to output heated compressed oxidant gas and wherein said oxidizer assembly is adapted to receive said heated compressed oxidant gas.

9. A fuel cell power production system in accordance with claim 3, wherein one of:
(A) said system further comprises a hydrogen transfer assembly for transferring hydrogen in said water-separated anode exhaust to an export path and for outputting hydrogen-separated gas, said control assembly is further adapted to selectively couple a portion of said water-separated anode exhaust to said hydrogen transfer assembly; and
(B) said system further comprises a hydrogen transfer assembly for transferring hydrogen in said water-separated anode exhaust to an export path and for outputting hydrogen-separated gas, said control assembly is further adapted to selectively couple a portion of said water-separated anode exhaust to said hydrogen transfer assembly, and wherein at least one of:
  (1) said fuel power production system further comprises a gas shift unit for converting CO in the anode exhaust to $H_2$ prior to transferring water from said anode exhaust; and
  (2) said supplemental fuel is used in said hydrogen utilization device to increase the amount of hydrogen in said water-separated anode exhaust being transferred to said export path.

10. A fuel cell power production system in accordance with claim 9, wherein one of:
(i) said hydrogen utilization device is further adapted to receive hydrogen-separated gas from said hydrogen transfer assembly, and said hydrogen transfer assembly comprises a compressor for compressing said portion of said water-separated anode exhaust and a PSA assembly for separating hydrogen from said compressed water-separated anode exhaust and outputting hydrogen separated gas to said hydrogen utilization device; and (ii) said hydrogen utilization device is further adapted to receive hydrogen-separated gas from said hydrogen transfer assembly, and said hydrogen transfer assembly comprises a compressor for compressing said portion of said water-separated anode exhaust, a PSA assembly for separating hydrogen from said compressed water-separated anode exhaust and outputting hydrogen separated gas to said hydrogen utilization device, and a blower for providing said portion of said portion of said water-separated exhaust to said compressor.

11. A fuel cell power production system in accordance with claim 1, wherein:

said system further comprises a compressor for compressing said water-separated anode exhaust and an oxidizer assembly for oxidizing and preheating said hydrogen utilization device exhaust to produce oxidant gas; and one of:

(a) said hydrogen utilization device comprises a combustion turbine, including a compressor portion for receiving and compressing air, a combustion portion for receiving and combusting compressed water-separated anode exhaust from said compressor and supplemental fuel to heat said compressed air, and a turbine portion for generating power from said heated compressed air and for outputting said hydrogen utilization device exhaust to said oxidizer assembly;

(b) said hydrogen utilization device comprises a recuperative turbine, including a compressor portion for receiving and compressing air, a recuperator for heating compressed air using at least one of anode exhaust and cathode exhaust, a combustion portion for receiving and combusting compressed water-separated anode exhaust from said compressor and supplemental fuel to further heat said compressed air, and a turbine portion for generating power from said further heated compressed air and for outputting said hydrogen utilization device exhaust to said oxidizer assembly;

(c) said hydrogen utilization device comprises a microturbine including a compressor portion for receiving and compressing air, a heater for pre-heating said compressed air, and a turbine portion for generating power from heated compressed air and for outputting hydrogen utilization device exhaust to said cathode, said system further comprises a boost compressor for compressing said water-separated anode exhaust and supplemental fuel to produce a compressed gas, and an oxidizer assembly for oxidizing said compressed gas and said compressed air from said heater and for outputting said heated compressed air to said turbine portion; and (d) said hydrogen utilization device comprises a microturbine including a compressor portion for receiving and compressing air, a heater for pre-heating said compressed air, and a turbine portion for generating power from heated compressed air and for outputting hydrogen utilization device exhaust to said cathode, said system further comprises a boost compressor for compressing said water-separated anode exhaust and supplemental fuel to produce a compressed gas, and an oxidizer assembly for oxidizing said compressed gas and said compressed air from said heater and for outputting said heated compressed air to said turbine portion, said compressed air from said compressor portion of said microturbine is further pre-heated using cathode exhaust and said water transfer assembly includes a cooling radiator for condensing and separating water in said anode exhaust, a pump for increasing pressure of the separated water and a humidifying heat exchanger for receiving the increased pressure water and cathode exhaust gas for humidifying the water and adding the humidified water to said fuel supply path.

12. A power production method for supplying power to a load using a fuel cell power production system comprising a high-temperature fuel cell, including an anode compartment and a cathode compartment, and a hydrogen utilization device, said method comprising:

providing fuel to said fuel cell anode from a fuel supply path;

outputting anode exhaust from said fuel cell anode compartment;

transferring water from said anode exhaust and outputting water-separated anode exhaust;

providing oxidant gas and one of said water-separated anode exhaust and gas derived from said water-separated anode exhaust to said hydrogen utilization device; and outputting hydrogen utilization device exhaust including oxidant gas from said hydrogen utilization device to said fuel cell cathode for use as oxidant gas;

wherein said hydrogen utilization device comprises one of an internal combustion engine, a diesel engine, a combustion turbine, a recuperative turbine, a microturbine and a low-temperature $CO_2$ and CO tolerant engine.

13. A power production method in accordance with claim 12, wherein one or more of:

(a) said transferring water from said anode exhaust comprises transferring a part or all of said water to said fuel supply path;

(b) said high-temperature fuel cell is a carbonate fuel cell;

(c) said method further comprises providing at least one of supplemental fuel and oxidant gas in the form of air to said hydrogen utilization device;

(d) said method further comprises providing at least one of supplemental fuel and oxidant gas in the form of air to said hydrogen utilization device and controlling providing said at least one of supplemental fuel and said air to said hydrogen utilization device using a control assembly responsive to variations in said load;

(e) said method further comprises pre-heating fuel in said fuel supply path using at least one of cathode exhaust and anode exhaust, and oxidizing and pre-heating said hydrogen utilization device exhaust in an oxidizer assembly to output said oxidant gas to said cathode; and (f) said method further comprises recycling a portion of cathode exhaust outputted by said cathode to said cathode.

14. A power production method in accordance with claim 13, wherein at least (d) and (e) in claim 13 apply, said method further comprising at least one of:

(a) bypassing a portion of said water-separated anode exhaust through a bypass path to said oxidizer without providing said anode exhaust to said hydrogen utilization device, wherein said water-separated anode exhaust being controlled using said control assembly by selectively coupling said water-separated anode exhaust to at least one of said hydrogen utilization device and said bypass path;

(b) storing a portion of said water-separated anode exhaust in a storage device, wherein said water-separated anode exhaust being controlled using said control assembly by selectively coupling said water-separated anode exhaust to said hydrogen utilization device; and (c) exporting a portion of said water-separated anode exhaust through an export path, wherein said water-separated anode exhaust is controlled using said control assembly by selectively coupling said water-separated anode exhaust to said export path.

15. A power production method in accordance with claim 14, wherein at least (a)-(c) in claim 14 apply and said control assembly includes a controller responsive to variations in said load and a coupling unit responsive to said controller, said method further comprising:

said controller selectively allowing portions of said water-separated anode exhaust to be conveyed to said hydrogen utilization device, said storage device, said export path and said bypass path, by coupling at least a portion of said water-separated anode exhaust to at least one of said hydrogen utilization device and said bypass path and by selectively allowing at least a portion of said water-separated anode exhaust in said storage device to be coupled to the hydrogen utilization device.

16. A power production method in accordance with claim 15, wherein said selectively allowing comprises:

said controller controlling said water-separated anode exhaust such that at least a portion of said water-separated anode exhaust is conveyed to at least one of said hydrogen utilization device and said bypass path at all operating times;

said controller controlling said water-separated anode exhaust such that when said load exhibits a low power demand, a portion of said water-separated anode exhaust is conveyed to at least one of said bypass path, said storage device and said export path; and said controller controlling said water-separated anode exhaust such that when said load exhibits a high power demand, said water-separated anode exhaust is conveyed to said hydrogen utilization device and a portion of said anode exhaust in said storage device is conveyed to said hydrogen utilization device.

17. A power production method in accordance with claim 16, wherein controlling providing supplemental fuel comprises said controller controlling supply of said supplemental fuel to said hydrogen utilization device such that when said load exhibits a low power demand, no supplemental fuel is supplied to said hydrogen utilization device, and when said load exhibits a high power demand, an increased amount of supplemental fuel is supplied to said hydrogen utilization device to satisfy said high power demand.

18. A power production method in accordance with claim 13, wherein at least (d) and (e) in claim 13 apply, further comprising:

transferring hydrogen in a portion of said water-separated anode exhaust to an export path using a hydrogen transfer assembly and outputting hydrogen-separated gas; and controlling said water-separated anode exhaust using said control assembly by selectively coupling said water-separated anode exhaust to said hydrogen transfer assembly.

19. A power production method in accordance with claim 18, further comprising one of:

(A) conveying said hydrogen-separated gas from said hydrogen transfer assembly to said hydrogen utilization device, wherein said transferring hydrogen in said portion of water-separated anode exhaust comprises compressing said portion of said water-separated anode exhaust using a compressor and separating said hydrogen from said compressed water-separated anode exhaust using a PSA assembly; and (B) conveying said hydrogen-separated gas from said hydrogen transfer assembly to said hydrogen utilization device, wherein said transferring hydrogen in said portion of water-separated anode exhaust comprises providing said portion of water-separated anode exhaust to a compressor using a blower, compressing said portion of said water-separated anode exhaust using said compressor and separating said hydrogen from said compressed water-separated anode exhaust using a PSA assembly.

20. A power production method in accordance with claim 13, wherein at least (d) and (e) in claim 13 apply, further comprising compressing oxidant gas using a compressor, pre-heating said compressed oxidant gas using said anode exhaust to provide heated compressed oxidant gas and providing said heated compressed oxidant gas to said oxidizer assembly.

* * * * *